(12) United States Patent
Thouin

(10) Patent No.: US 11,002,059 B2
(45) Date of Patent: May 11, 2021

(54) ELECTRIC DOOR OPENER FOR MULTI-DOOR TRAILER

(71) Applicant: REMORQUES CFT INC., Sainte-Anne-des-Plaines (CA)

(72) Inventor: Francois Thouin, Sainte-Anne-des-Plaines (CA)

(73) Assignee: REMORQUES CFT INC., Sainte-Anne-des-Plaines (CA)

( * ) Notice: Subject to any disclaimer, the term of this patent is extended or adjusted under 35 U.S.C. 154(b) by 158 days.

(21) Appl. No.: 16/362,177

(22) Filed: Mar. 22, 2019

(65) Prior Publication Data
US 2020/0002993 A1    Jan. 2, 2020

Related U.S. Application Data

(60) Provisional application No. 62/691,924, filed on Jun. 29, 2018.

(51) Int. Cl.
| | | |
|---|---|---|
| *B60J 5/04* | (2006.01) | |
| *B60J 5/08* | (2006.01) | |
| *B62D 63/08* | (2006.01) | |
| *E05F 15/684* | (2015.01) | |
| *E05D 15/16* | (2006.01) | |

(52) U.S. Cl.
CPC ........... *E05F 15/684* (2015.01); *B60J 5/0497* (2013.01); *B60J 5/08* (2013.01); *B62D 63/08* (2013.01); *E05D 15/165* (2013.01); *E05Y 2900/516* (2013.01); *E05Y 2900/531* (2013.01)

(58) Field of Classification Search
CPC . B60J 5/0497; B60J 5/062; B60J 5/067; B60J 5/08; E05D 15/16; E05D 2015/225; E05Y 2900/516; E05Y 2900/531; B62D 63/08; E05F 15/684
USPC ............... 296/186.4, 155; 160/218, 239, 241
See application file for complete search history.

(56) References Cited

U.S. PATENT DOCUMENTS

| | | | | |
|---|---|---|---|---|
| 1,916,651 A | * | 7/1933 | Beeman ................. | E05F 15/684 160/189 |
| 2,742,280 A | * | 4/1956 | Wilcox ................. | E05F 15/684 160/189 |
| 3,160,198 A | * | 12/1964 | Adler ................... | B61D 19/005 160/113 |

(Continued)

FOREIGN PATENT DOCUMENTS

WO        2017096070        6/2017

*Primary Examiner* — Gregory A Blankenship
(74) *Attorney, Agent, or Firm* — Benoit & Cote, Inc.; C. Marc Benoit

(57) ABSTRACT

A merchandise container comprises a body having a longitudinal axis, which comprises a floor, a roof and a side wall, each comprising an exterior face and an interior face, and a plurality of bays in the side walls. A plurality of bay doors adapted to controllably closing the bays. A door opening system comprising a plurality of door axles each driving individually one of the plurality of bay doors between a closed position and an open position; an intermediate axle in driving arrangement with the plurality of door axles; and a motor connected in driving arrangement with the intermediate axle comprising a driving axle controls the position of the bay doors by driving the intermediate axle which in turn drives the plurality of door axles to move the plurality of bay doors between the closed position to the open position.

15 Claims, 13 Drawing Sheets

(56) References Cited

U.S. PATENT DOCUMENTS

| | | | | |
|---|---|---|---|---|
| 3,836,769 A * | 9/1974 | Wilson | | B62D 53/06 |
| | | | | 296/10 |
| 4,449,562 A * | 5/1984 | Leivenzon | | E06B 9/58 |
| | | | | 160/113 |
| 4,659,132 A * | 4/1987 | Day | | B60P 3/055 |
| | | | | 296/186.4 |
| 5,056,847 A | 10/1991 | Stillwell et al. | | |
| 5,154,468 A * | 10/1992 | Teigen | | B60J 5/08 |
| | | | | 160/133 |
| 5,207,259 A * | 5/1993 | Shepherd | | B60J 5/08 |
| | | | | 160/133 |
| 5,277,240 A * | 1/1994 | Epema | | B60J 5/08 |
| | | | | 160/188 |
| 6,022,067 A * | 2/2000 | Hargett | | B60J 5/08 |
| | | | | 296/155 |
| 6,082,433 A | 7/2000 | Vafaie et al. | | |
| 6,085,825 A * | 7/2000 | Swink | | B60J 5/08 |
| | | | | 160/133 |
| 6,099,070 A * | 8/2000 | Yocum | | B62D 33/042 |
| | | | | 296/182.1 |
| 6,276,744 B1 | 8/2001 | Huber et al. | | |
| 6,883,579 B2 | 4/2005 | Olmsted | | |
| 7,469,737 B2 | 12/2008 | Mullet et al. | | |
| 8,528,622 B2 | 9/2013 | Ehrlich | | |
| 9,511,960 B1 * | 12/2016 | Bradford | | B60J 5/08 |
| 9,610,830 B2 | 4/2017 | Orton et al. | | |
| 10,000,960 B2 | 6/2018 | Angiuli et al. | | |
| 2001/0032486 A1 | 10/2001 | Doucette | | |
| 2005/0126720 A1 * | 6/2005 | Rekret | | E05F 15/67 |
| | | | | 160/201 |
| 2005/0126721 A1 * | 6/2005 | Fan | | E05D 15/26 |
| | | | | 160/201 |
| 2007/0256797 A1 | 11/2007 | Orton et al. | | |
| 2014/0231030 A1 | 8/2014 | James | | |
| 2015/0308175 A1 | 10/2015 | Wachtell et al. | | |
| 2018/0257880 A1 * | 9/2018 | Garner | | B65G 63/002 |
| 2020/0002993 A1 * | 1/2020 | Thouin | | B60J 5/08 |

* cited by examiner

ELECTRIC DOOR OPENER FOR MULTI-DOOR TRAILER

CROSS-REFERENCE TO RELATED APPLICATION

This application claims priority from U.S. provisional patent application 62/691,924 filed Jun. 29, 2018, the specification of which is hereby incorporated herein by reference in its entirety.

BACKGROUND

(a) Field

The subject matter disclosed generally relates to devices for containers for transporting and delivering merchandise. More particularly, the subject matter disclosed relates to the operation of bay doors for such containers.

(b) Related Prior Art

In existing trailers comprising multiple lateral bay doors, the bay doors must be hand operated. Such trailers are, for example, used for delivery of crates of beverages. During delivery rounds, bay doors must be manually opened and closed multiple times. Manual operation of such bay door is often the cause of unnecessary fatigue and injuries among delivery personnel.

There is therefore a need for improved systems for operating the opening and closure of bay doors on multi-door trailers.

SUMMARY

According to an embodiment, there is provided a door opening system for a merchandise container comprising a plurality of bay doors, the door opening system comprising: a plurality of door axles each driving individually a bay door of the plurality of bay doors between a closed position and an open position; an intermediate axle in driving arrangement with the plurality of door axles; and a motor connected in driving arrangement with the intermediate axle comprising a driving axle, wherein the motor drives the intermediate axle which in turn drives the plurality of door axles to move the plurality of bay doors between the closed position to the open position.

According to an aspect, the door opening system further comprises a driving sprocket mounted to the driving axle, a driven sprocket mounted to the intermediate axle, and a main driving chain connecting the driving sprocket to the driven sprocket.

According to an aspect, the door opening system further comprises a plurality of door driving sprockets mounted to the intermediate axle, a door driven sprocket mounted to each of the door axles, and a plurality of door driving chains with each one of the door driving chains connecting one of the door driving sprockets to a corresponding door driven sprocket.

According to an aspect, the door opening system further comprises a pin, wherein, using the pin, a releasable sprocket among the plurality of door driving sprockets is releasably mounted to a releasable axle among the axles, whereby the releasably sprocket can be released from the releasably axle by removing the pin.

According to an aspect, the door opening system further comprises a counter balance providing a force towards the opening of the bay doors.

According to an aspect, the counter balance is mounted to one of the door axles.

According to an aspect, the counter balance is mounted to the intermediate axle.

According to an aspect, the door opening system further comprises a control circuit adapted to transmit signals to the motor.

According to an aspect, the motor operates in three modes comprising: an opening mode in which the motor spins the driving axle for opening the bay doors; an idle mode in the motor is locked in position thereby preventing spinning of the driving axle; and a neutral mode in which the driving axle is free to spin backward resulting in the bay doors closing.

According to an aspect, the door opening system further comprises a position detection system comprising a door-mounted position detection component and a body-mounted position detection component, wherein when the door-mounted position detection component is in close proximity to the body-mounted position detection component, a signal indicative of a monitored position being reached is triggered.

According to an aspect, the door opening system further comprises a cable or a strap linking each of the door axles with a corresponding one of the bay doors.

According to an embodiment, there is provided a merchandise container comprising: a body having a longitudinal axis, the body comprising: a side wall; and a plurality of bays in the side walls; a plurality of bay doors adapted to controllably close the bays; and a door opening system comprising: a plurality of door axles each driving individually one of the plurality of bay doors between a closed position and an open position; an intermediate axle in driving arrangement with the plurality of door axles; and a motor connected in driving arrangement with the intermediate axle comprising a driving axle; wherein the motor drives the intermediate axle which in turn drives the plurality of door axles to move the plurality of bay doors between the closed position and the open position.

According to an aspect, the plurality of bay doors comprises neighbor bay doors, and wherein the body comprises a dividing wall extending between the neighbor bay doors, and wherein the door axles are mounted to the dividing wall.

According to an aspect, the merchandise container further comprises guiding rails extending about the bays, and wherein the guiding rails extends between the body and the door axles.

According to an aspect, the plurality of bay doors comprises neighbor bay doors, wherein the body comprising a dividing wall extending between the neighbor bay doors, and wherein the door opening system comprises a bearing assembly mounted to the dividing wall and through which extends the intermediate axle.

According to an aspect, the plurality of bay doors comprises neighbor bay doors, wherein the body comprising a dividing wall extending between the neighbor bay doors, and wherein the motor is mounted to the dividing wall.

According to an aspect, the body comprises a front wall and a rear wall, and wherein the motor is mounted to one of the front wall and the rear wall.

According to an aspect, the merchandise container further comprises an electrical system, wherein the door opening system is connected to the electrical system.

According to an aspect, the door opening system further comprises a control circuit adapted to transmit signals to the motor.

According to an aspect, the side wall comprises an interior face, wherein the body comprise guiding rails adapted for guiding the bay doors, and wherein the guiding rails extend at least about the interior faces of the side wall.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
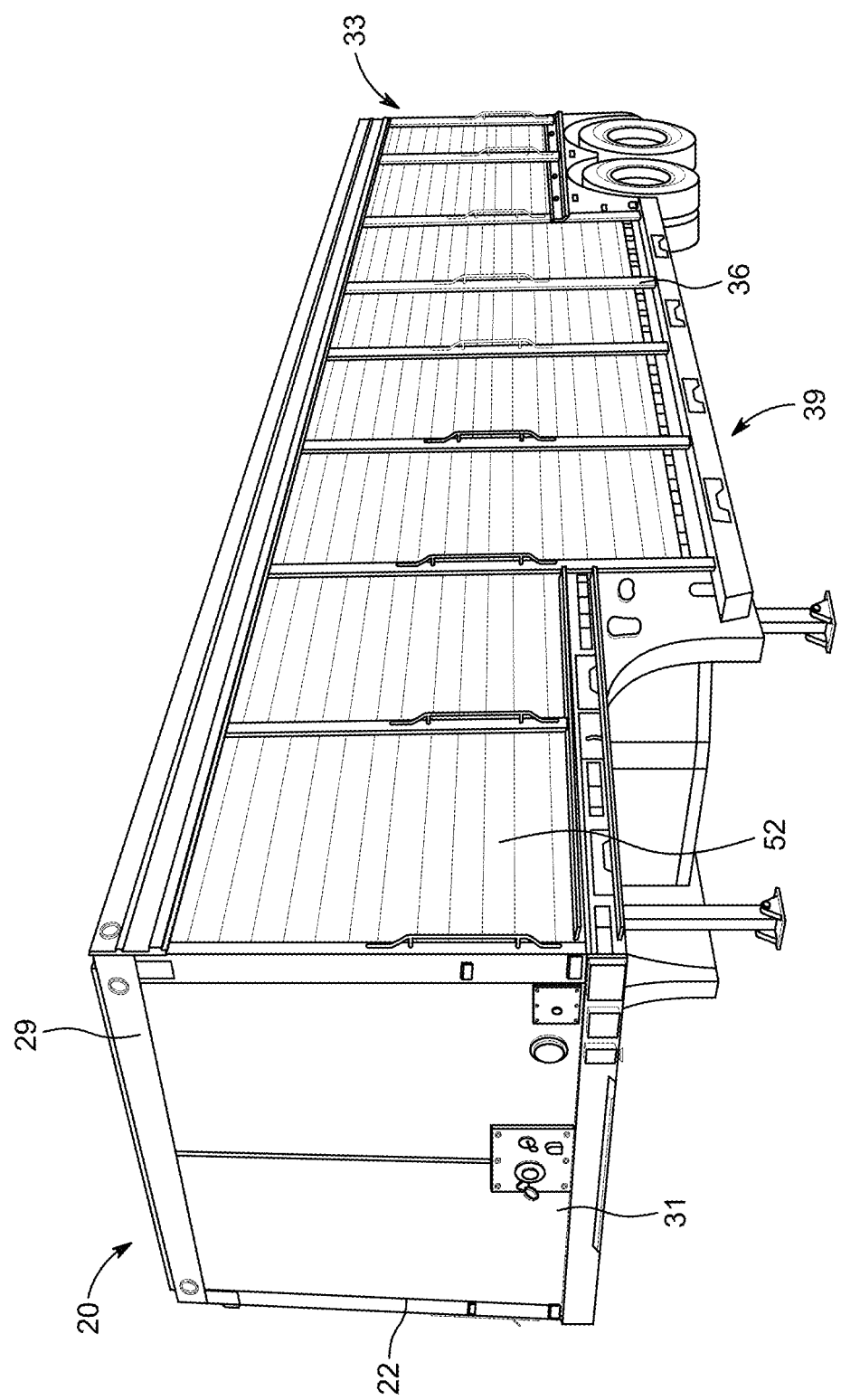
FIG. 1 is an external perspective view of a merchandise container comprising a series of bays closed by bay doors on shown the side wall of the merchandise container in accordance with an embodiment.
Figure 2:
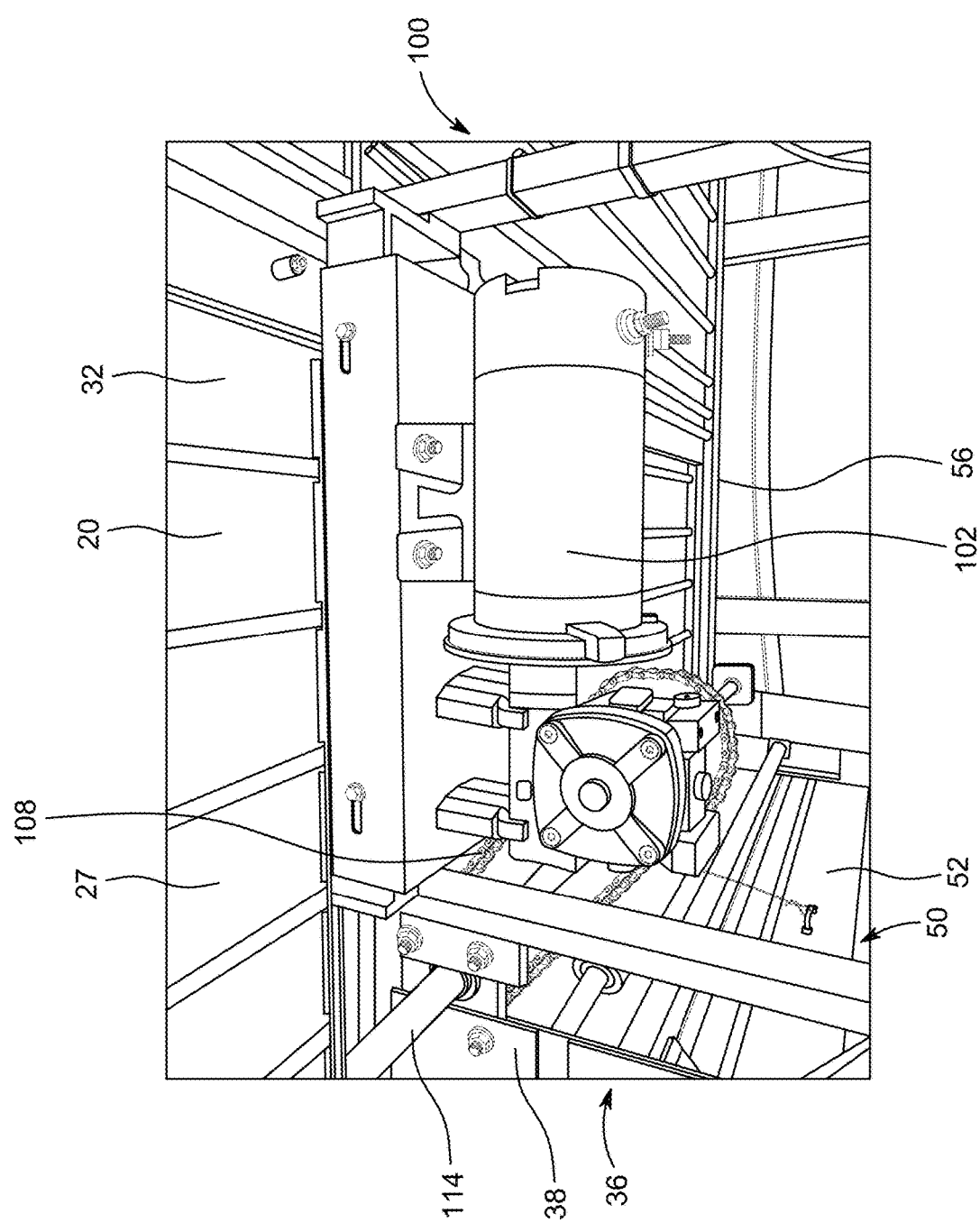
FIG. 2 is an internal view of a merchandise container and components of the door opening system comprising with a motor mounted to the ceiling of the merchandise container in accordance with an embodiment.

Referring now to the drawings, and more particularly to FIGS. 1, 2, 10 and 13, a door opening system 100 is adapted to open and close doors of a merchandise container 20. The merchandise container 20 may be either box truck with a merchandise container or a hauled merchandise container. In accordance with an embodiment, doors are bay doors 52. In accordance with a further embodiment, doors are side-by-side disposed bay doors 52, a.k.a. neighbor bay doors closing side-by-side neighbor bays 50. According to an embodiment, the merchandise container 20 comprises a floor 39, a roof 32 and side walls 36, as a front wall 31 and a rear wall 33, each comprising an interior face (27) and an exterior face (29). According to an embodiment, the merchandise container 20 has a longitudinal axis defined by the normal moving or hauling direction of the merchandise container 20, with a plurality of side-by-side bay doors 52 being disposed along a side of the merchandise container 20 with respect of the longitudinal axis of the merchandise container 20. Thus, the bay doors 52 are used to close bays 50, a.k.a. openings, on a side wall 36 of the merchandise container 20.

Figure 13:
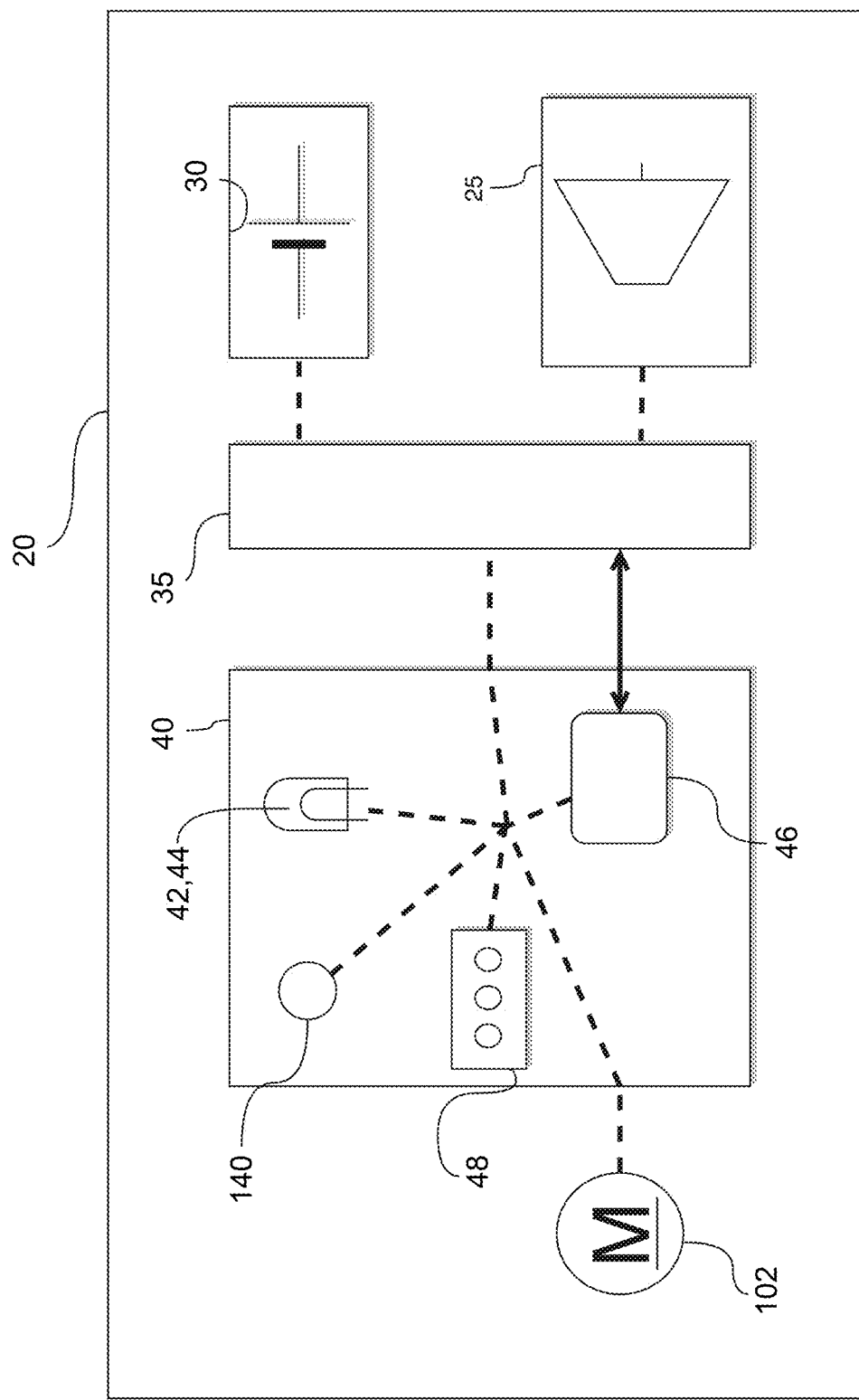
FIG. 13 is a schematic of the electric circuit of the door opening system in accordance with an embodiment.

The door opening system 100 of the merchandise container 20 comprises a motor 102, namely an electric motor, driven by a vehicle-mounted power source 30 (FIG. 13). According to another embodiment, the vehicle-mounted power source 30 is a vehicle battery (not shown) of a box truck comprising a powertrain 25 such as an internal combustion engine, or according to another embodiment (not shown), the battery (i.e., power source 30) of a merchandise container-hauling vehicle.

According to an embodiment (depicted on FIG. 2), the motor 102 is mounted to the roof 32 of the merchandise container 20. According to an embodiment (depicted on FIG. 12), the motor is mounted to the dividing wall 38 extending inwardly between two neighbor bays 50. According to a further embodiment (not shown), the motor 102 is mounted to the interior of one of the front wall 31 and the rear wall 33.

According to an embodiment (schematically shown in FIG. 13), the power transmitted to the motor 102 is transmitted from the power source 30 through the electrical circuit 35 of the merchandise container 20 and through a control circuit 40 that controls when the motor 102 is powered, based on the state of the vehicle (e.g., running, stopped with the powertrain 25 of the vehicle in an idle mode, the electric circuit switched to an auxiliary-running state with the powertrain 25 shut off, and the whole vehicle shut off).

The control circuit 40 may further comprise indicators 42 such as visual indicators 44 (e.g., lights) indicating the state of the bay doors 52 (e.g., open, close, in operation) to the operator of the vehicle, for instance in the cabin of the vehicle. The control circuit 40 may further comprise interlock circuits 46 preventing operations (e.g., the merchandise container 20 from advancing) when a particular state (e.g., bay doors 52 being open) is detected. The control circuit 40 further comprises controls 48, such as switches or push buttons, operable by the operator to activate the motor 102 to open or close the bays 50 as further described, with the location and number of controls 48 depending on the design and intent of the merchandise container 20. According to an embodiment, control 48 is a remote control for operating the bay doors 52 at a distance. The control circuit 40 further comprises a position detection system 140 comprising one or more position detection components to detect position(s) of the bay doors 52 as will be explained below. The position detection system 140 will be further discussed below.

Figure 7:
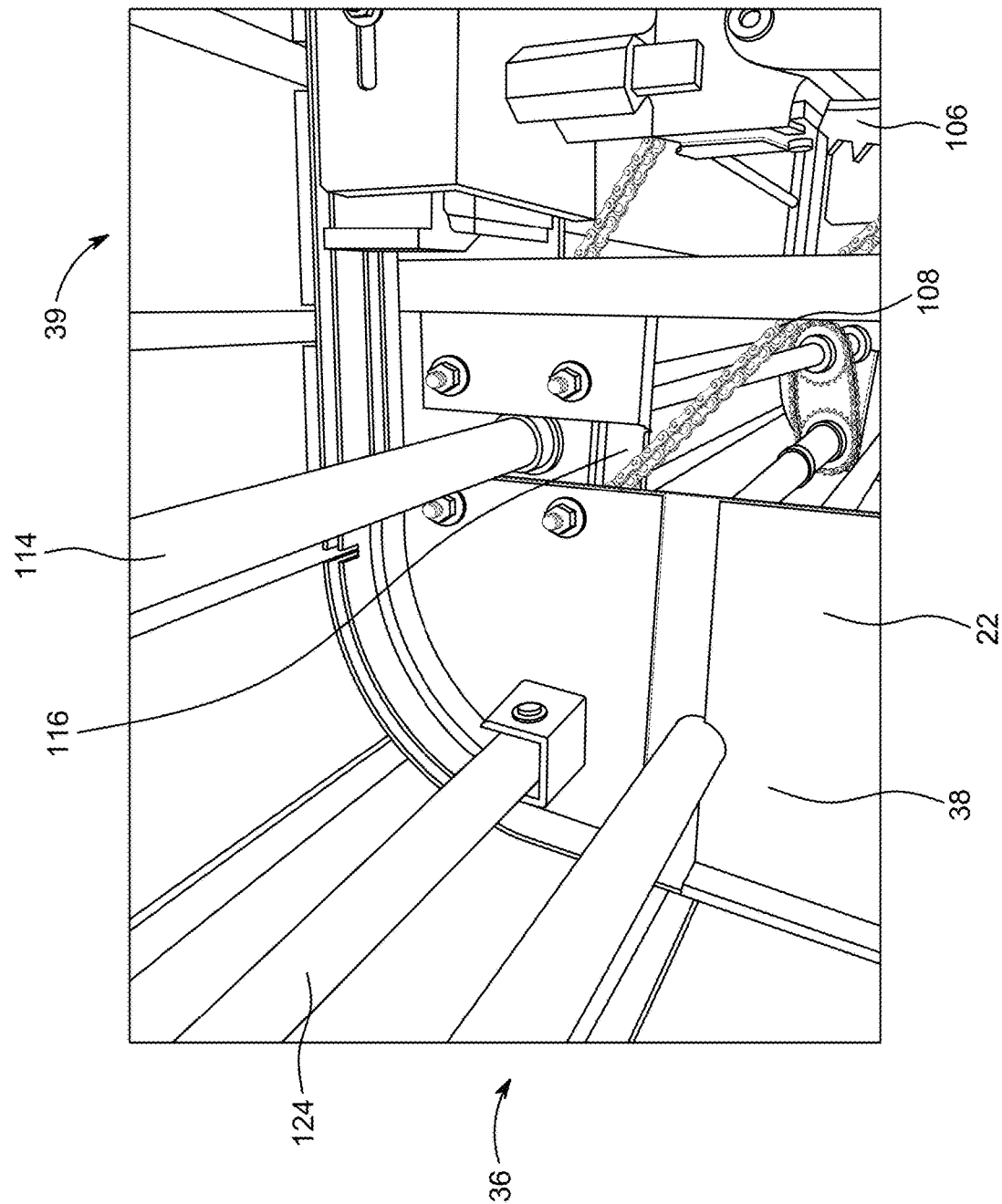
FIGS. 7 and 8 are perspective views of components of the door opening system comprising the motor, the driving axle, the intermediate axle and a door axle.
Figure 8:
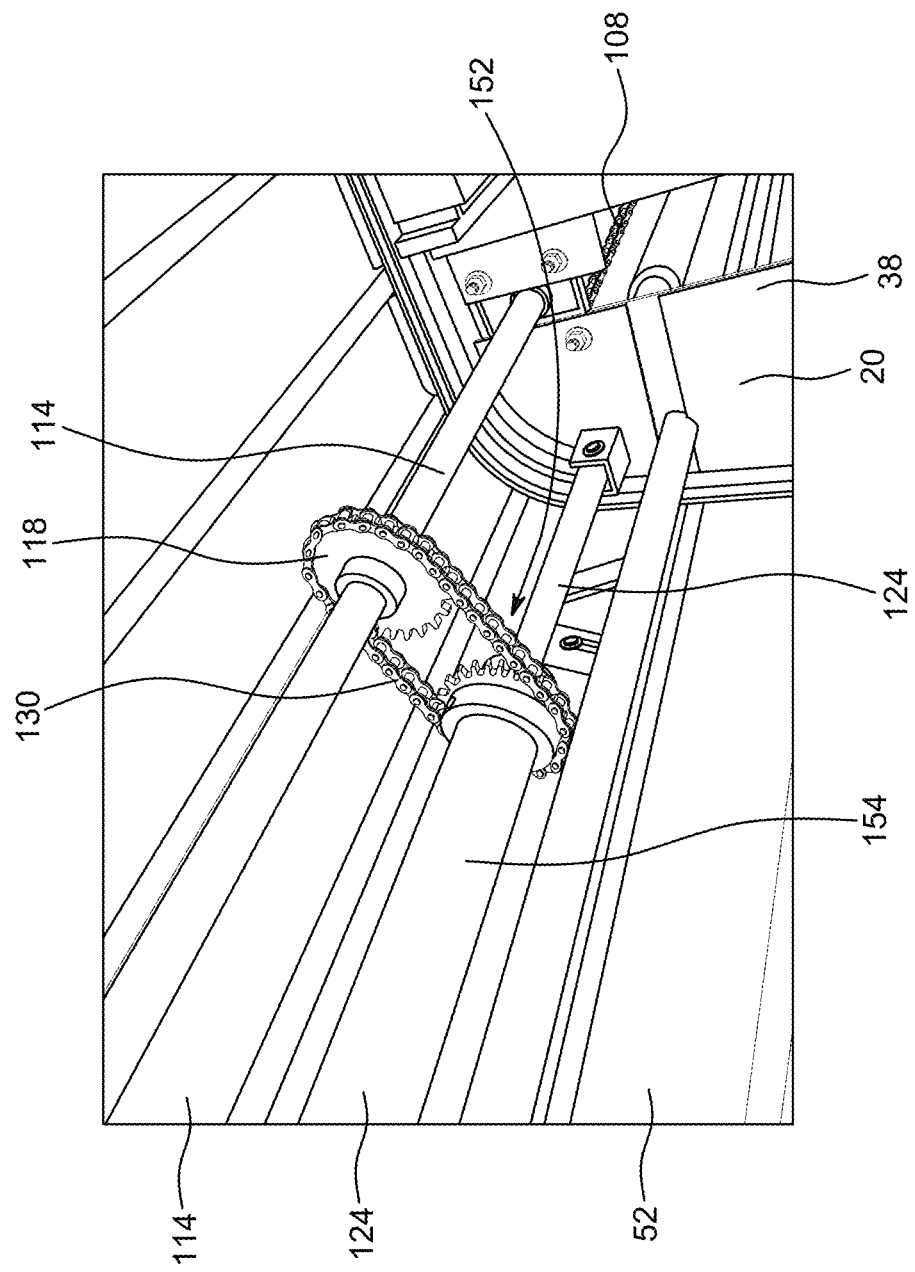
Figure 9:
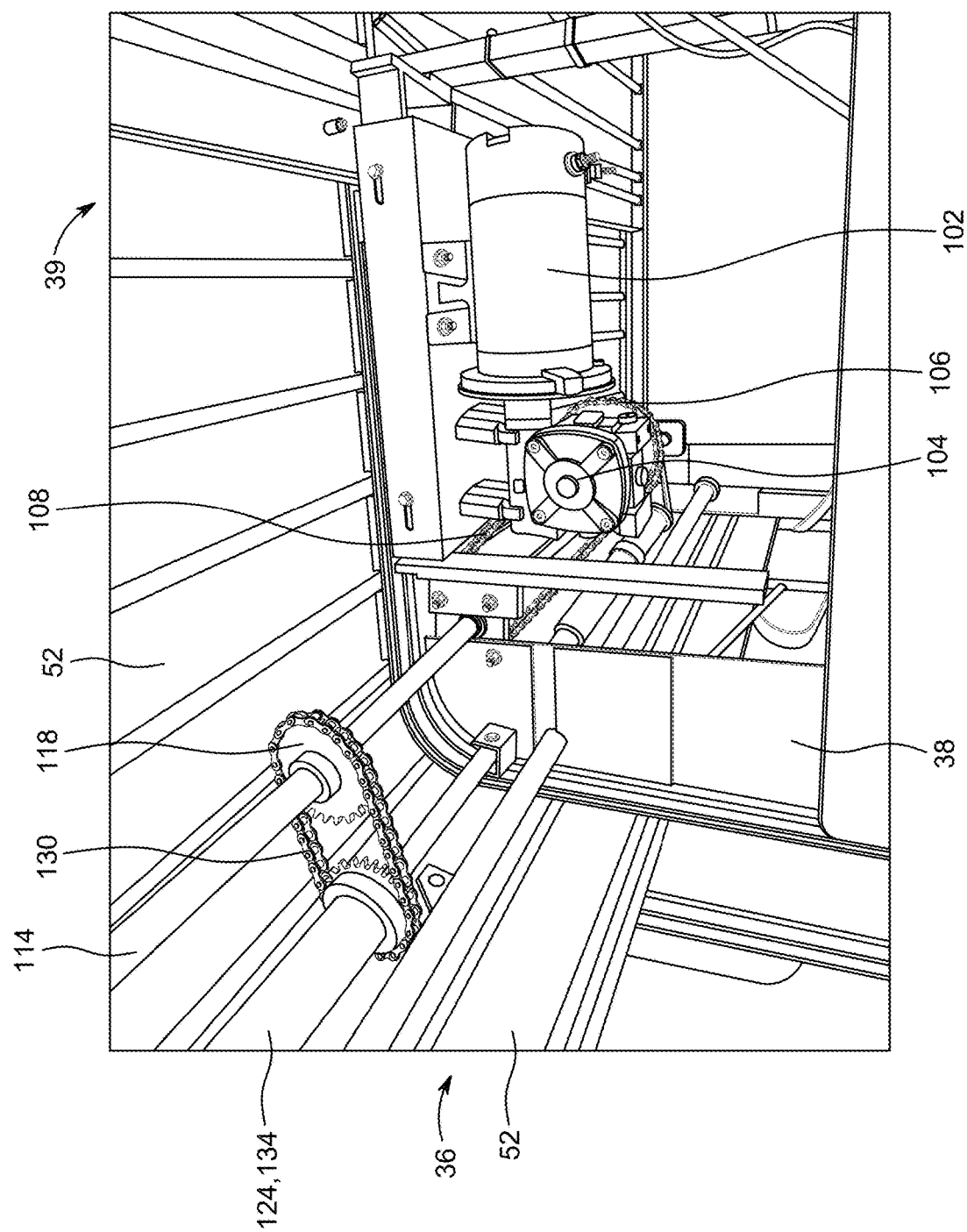
FIG. 9 is a side perspective view of the merchandise container to which are mounted bay doors and a door opening system in accordance with an embodiment.
Figure 12:
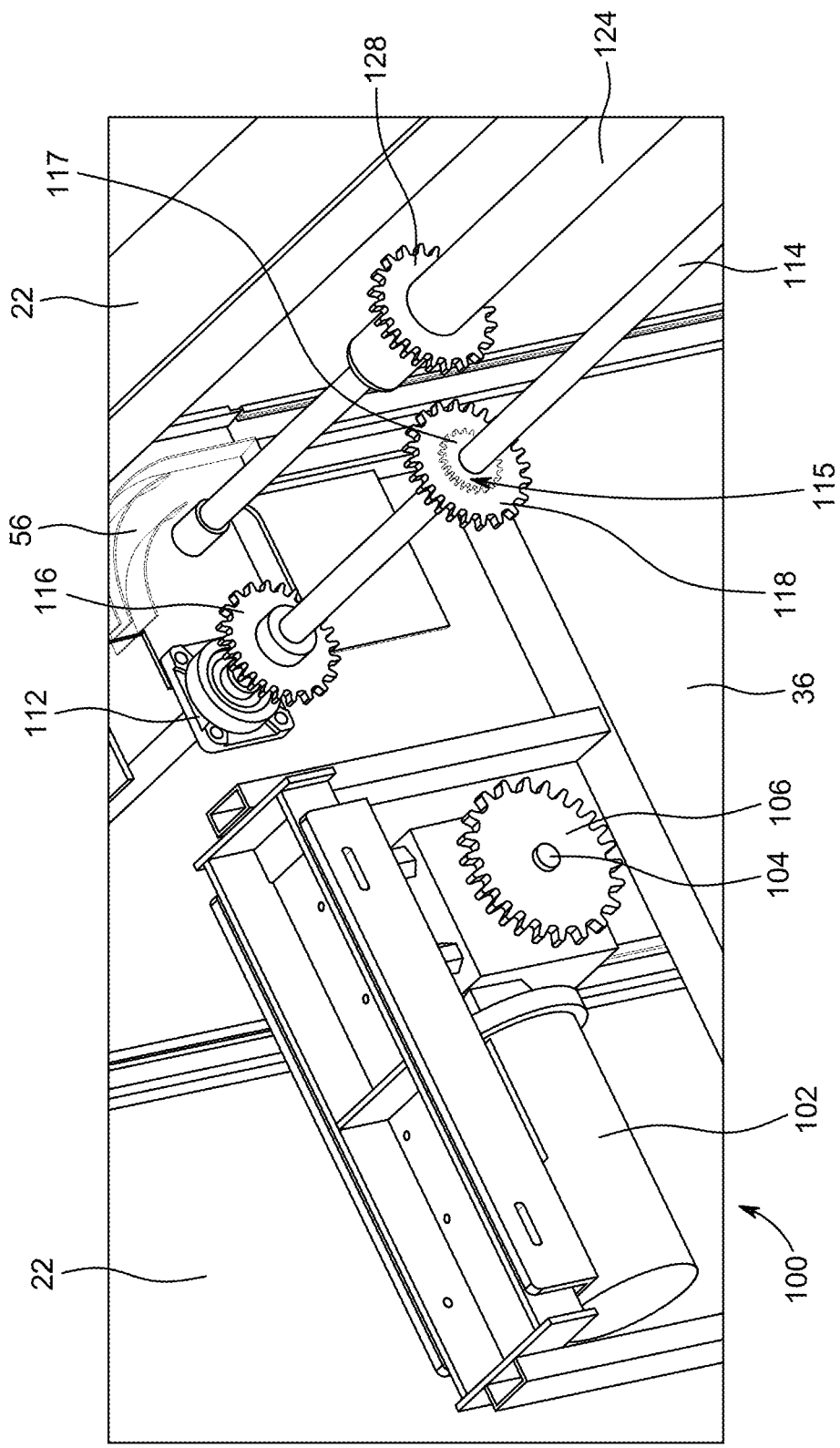
FIG. 12 is a top perspective schematic of a door opening system mounted to a merchandise container, with the top of the merchandise container removed from the view.

Referring additionally to FIGS. 7 and 9, particularly in combination with FIG. 12, there is shown the motor 102 which comprises a gear box with a driving axle 104 to which is mounted a driving sprocket 106. A main driving chain 108 is mounted on the driving sprocket 106, and on a driven sprocket 116 to which is secured an intermediate axle 114. The driving chain 108, via the driven sprocket 116, drives the intermediate axle 114.

The intermediate axle 114 extends along an axis parallel to the side wall 36 and the roof 32 of the merchandise container 20, and thus the general plane of the bay doors 52. The length of the intermediate axle 114 extends about at least part of all of the bay doors 52. Typically, the intermediate axle 114 is mounted about the top of the bay doors 52, optimizing the clearance associated with the bays 50.

Individual driving sprockets 118 are secured to the intermediate axle 114 and each of the driving sprockets 118 drives one of the counter balance 134 as discussed below. On each of the counter balances 134 is secured a driven sprocket 128 which is driven by the corresponding driving sprocket 118 via individual door driving chains 130. The individual door driving chains 130 hence each engage a driven sprocket 128 and a corresponding driving sprocket 118.

Accordingly, the power from the motor 102 is transmitted to all the counter balances 134 by the main driving chain 108, which drives the intermediate axle 114, driving the individual door driving chains 130 which in turn controls the operation of each of the bay doors 52 to open and close at the same time. Hence a single intermediate axle 114 is used to drive a plurality of counter balances 134.

According to an embodiment, bay doors 52 linked to the same motor 102 will always open and close at the same time. However, one must note that a merchandise container 20 may be equipped with a plurality of motors 102 and bay doors 52, for example bay doors 52 on each side of the merchandise container 20, with a motor 102 controlling the opening and closing of the bay doors 52 located on a first side of the merchandise container 20, and a second motor 102 controlling the opening and closing of the bay doors 52 located on a second side of the merchandise container 20.

According to yet another embodiment, a merchandise container 20 is equipped with multiple motors 102 on a same side to operate multiple bay doors 52. According to such an embodiment, each of the motors 102 may control one or a plurality of bay doors 52.

According to an embodiment, the driving axle 104 is a short driving shaft extending from the motor 102. The intermediate axle 114 is a single-piece shaft extending over about the length of the merchandise container 20. In fact, the intermediate axle 114, regardless being made of a single piece or multiples pieces combined as a rigid assembly, must be long enough to cover the distance between the driven sprockets 128 of the bay doors 52 that must be opened concurrently.

Figure 5:
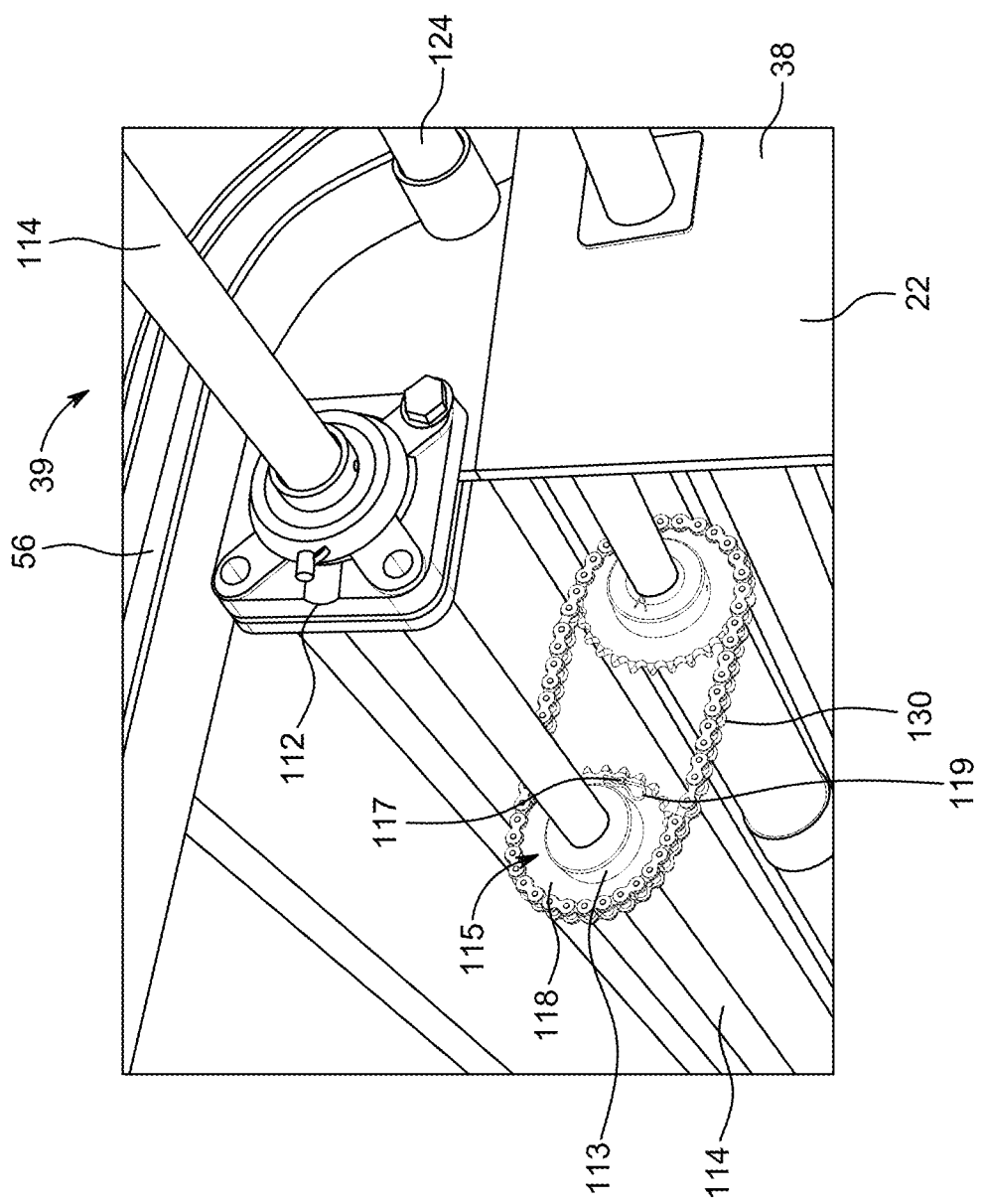
FIG. 5 is a perspective view of components of the door opening system comprising the intermediate axle mounted to an internal part of the body of the merchandise container.
Figure 6:
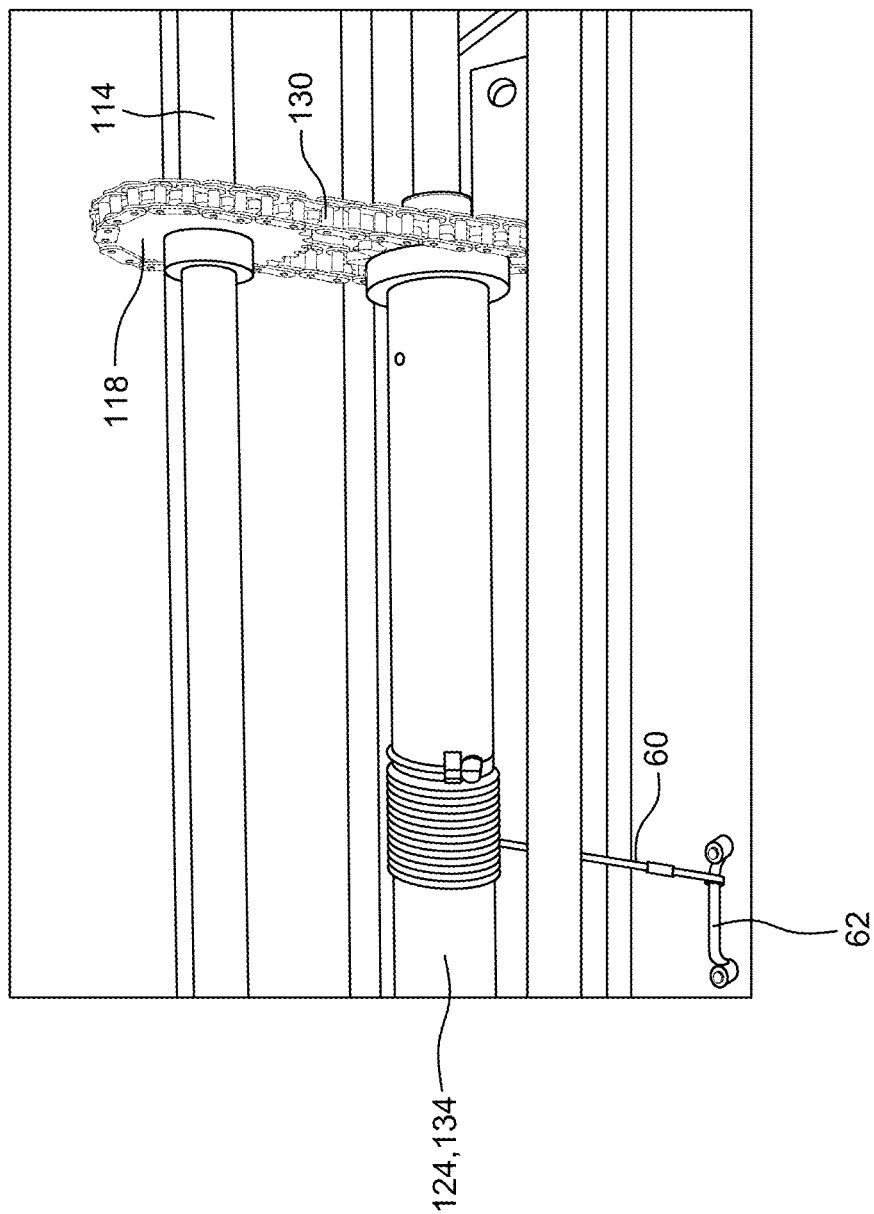
FIG. 6 is a perspective view of the components of the door opening system comprising the intermediate axle and a door axle.

The intermediate axle 114 is mounted to the body of the merchandise container 20 about its extremity in-between two bay doors 52. The intermediate axle 114 is mounted to the body 22, specifically the dividing wall 38 extending between the two neighbor bays 50, through bearing assemblies 112 (shown in FIG. 5). According to an embodiment, the door axles 124 are mounted to the body 22 of the merchandise container 20 along a common axis. According to an embodiment, the bearing assemblies 112 are mounted to the dividing wall 38.

According to an embodiment, the counter balance 134 comprises an inner axle 152 and an outer casing 154. The inner axle 152 is rigidly mounted to the body, about the door guiding rails 56 of a bay door 52, independent from another counter balance 134. The outer casing 154 is mounted to the inner axle 152 to freely spin around the inner axle 152, with or without a biasing means mounted thereto the inner axle 152 and the outer casing 154. To each of the bay 50, a counter balance 134 is associated a driving sprocket 118 and a driven sprocket 128 transmitting the same rotation movement from the intermediate axle 114 to all of the door axles 124 connected to the same motor.

An operator may disconnect the bays doors 52 from the motor 102 to manually operate the bay doors 52. The driving sprocket 118 is releasably attached to a linking ring 115 fixedly mounted to the intermediate axle 114, resulting in a releasable sprocket/releasable axle combination. A pin 117 releasably links the driving sprocket 118 to the linking ring 115, resulting in the driving sprocket 118 rotating with the intermediate axle 114 when the pin 117 is in place, and rotating freely relative to the intermediate axle 114 when removed. A cotter pin 119 mounted to the pin 117 secures the pin 117 in place when the pin 117 passes through the driving sprocket 118 and secures the linking ring 115. According to an embodiment, the linking ring 115 is secured to the intermediate axle 114 using a radial screw 113 mounted to the linking ring 115 and contacting the surface of the intermediate axle 114. Alternatively, the linking ring 115 is secured to the intermediate axle 114 using a clamping solution. The linking ring 115 could also be secured to the intermediate axle 114 by welding.

According to an embodiment, the driving sprocket 106 and the driving axle 104 are mounted as a releasable sprocket/releasable axle combination.

The rotation axes of the driving axle 104, the intermediate axle 114 and the counter balances 134 are parallel to each other. Such a configuration allows the transmission of movement through driving chains 108, 130.

According to an embodiment, the driving sprocket 106, the driven sprocket 116 and the driving chain 108 joining the driving sprocket 106 to the driven sprocket 116 define a main driving combination. According to an embodiment, an alternative main driving combination comprises one of plurality of gears, or pulleys and a strap joining the pulleys.

According to an embodiment, a driving sprocket 118, a driven sprocket 128 aligned with the driving sprocket 118 and the driving chain 130 joining the driving sprocket 118 to the driven sprocket 128 define a door-driving combination, with each door-driving combination driving a distinct bay door 52. According to an embodiment, an alternative main door-combination comprises one of plurality of gears, or pulleys and a strap joining the pulleys.

Referring now additionally to FIGS. 5, 6, 8 and 12. The bay doors 52 of the bays 50 are operated by sliding them upward and inward to open them. Guiding rails 56, mounted to the body 22 of the merchandise container 20 about the sides of the bay doors 52, guide the displacement of the bay door 52, through rollers 58 extending from the sides of the bay doors 52 and being guided within the guiding rails 56 when the bay doors 52 open or close. Over each of the bay doors 52, when in a closed position, is the door axle 124 mounted to the body 22 of the merchandise container 20, with the bay door 52 being linked to the door axle 124 through a foot cable 60 attached to a foot fixture 62 located about the bottom of the inner face of the bay door 52.

According to other embodiments, door connection means different from the above foot cable 60 may be used to connect the door axles 124 to the bay doors 52, with the door connection means being used to at least one of pull the bay doors 52 upward or push the bay doors 52 downward. Finally, based on embodiments, the door connection means may involve a rigid connection communicating displacement of the one of the bay doors 52 and the door connection means to the other regardless of the movement direction.

According to an embodiment, the guiding rails 56 extend from the bottom of the bays 50 (about the floor 39 of the merchandise container 20) to the top of the bays 50 (depicted about the roof 32) and extend further to free completely the bays 50 when the bay doors 52 are in an open position. According to an embodiment, the guiding rails 56 extend inwardly from the about the top of the bays 50 about and parallel to the roof 32. The intermediate axle 114 and the door axles 124 extend parallel to the roof 32 parallel to the longitudinal axis of the merchandise container 20 under the guiding rails 56. Thus, the guiding rails 56 extend between the axles (114, 124) and the roof 32.

According to an embodiment, the counter balance 134 comprises biasing means (not shown, operating within the mounting of the door axles 124) biasing the bay doors 52 toward an open position. When the bay doors 52 are opening, the door axles 124 spin, winding up the foot cables 60 of each of the bay doors 52 around the corresponding counter balance 134. When the bay doors 52 are closing, the biasing means produces a force over the bay doors 52 toward the open position while the weight of the bay doors 52 overbalancing the force of the counter balances 134 resulting in downward movement of the bay doors 52 and the cable 60 being kept under tension. During the closing phase, the motor 102 allows the driving chain 108 to turn and thus the bay doors 52 to return to a closed position.

Figure 10:
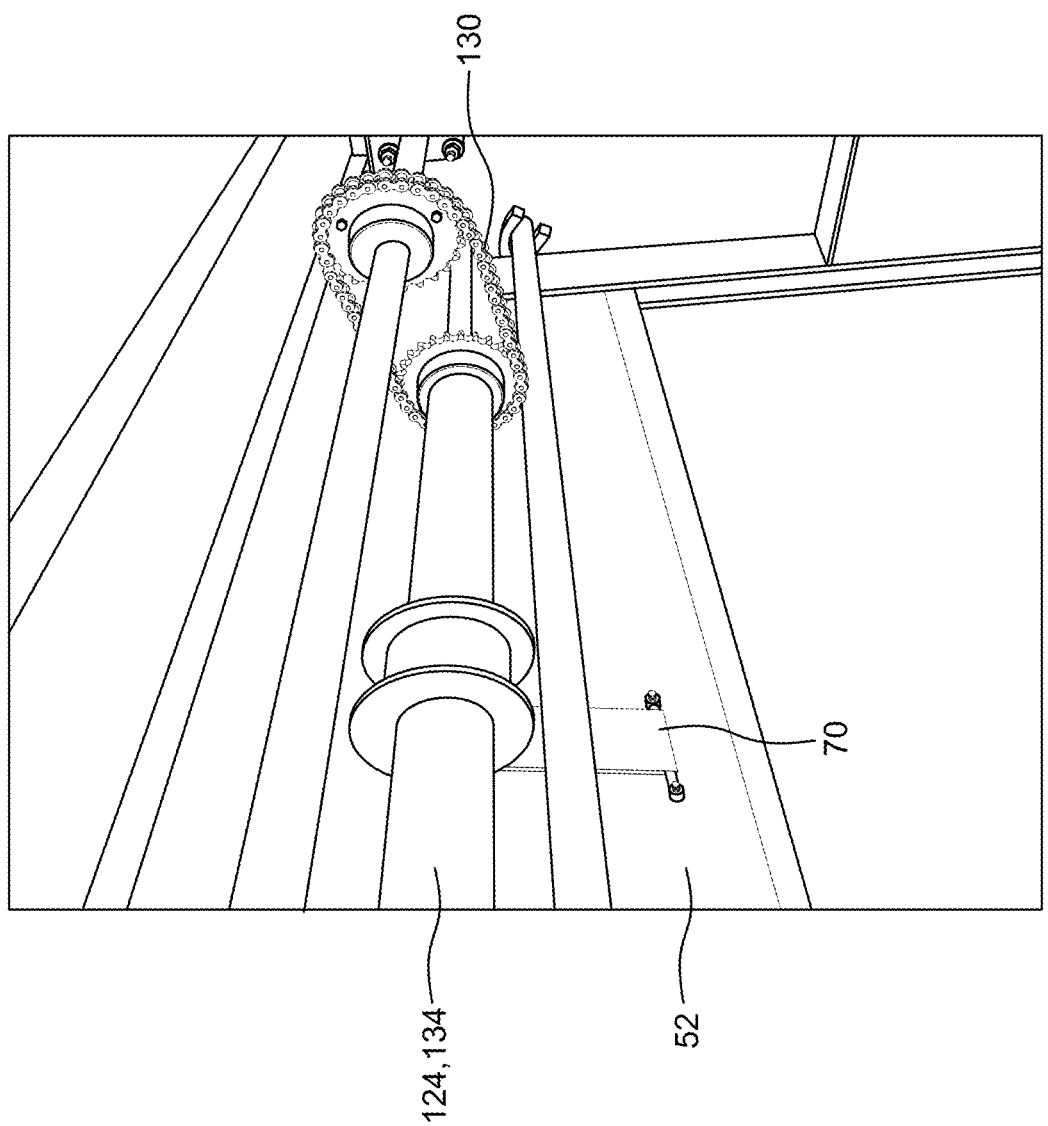
FIG. 10 is a perspective view of the merchandise container to which are mounted the bay doors and a door opening system in accordance with another embodiment.
Figure 11:
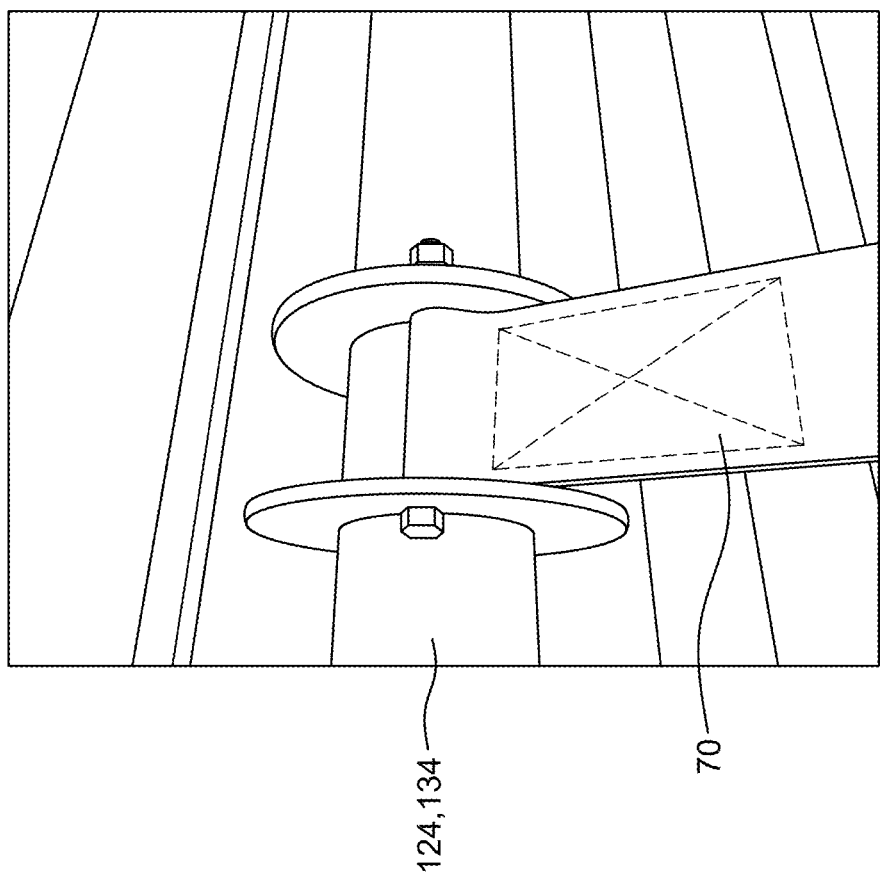
FIG. 11 is a close-up perspective view of the system for pulling up the bay doors of in accordance with the embodiment of FIG. 10.

Now referring to FIGS. 10 and 11, another embodiment comprises a strap 70 acting in a similar fashion as the foot cable 60 described before. The strap 70 is attached at one extremity to the bay door 52 and at the other extremity to the counter balance 134 to pull the bay door 52 up as the strap 70 winds up around the counter balance 134.

Figure 3:
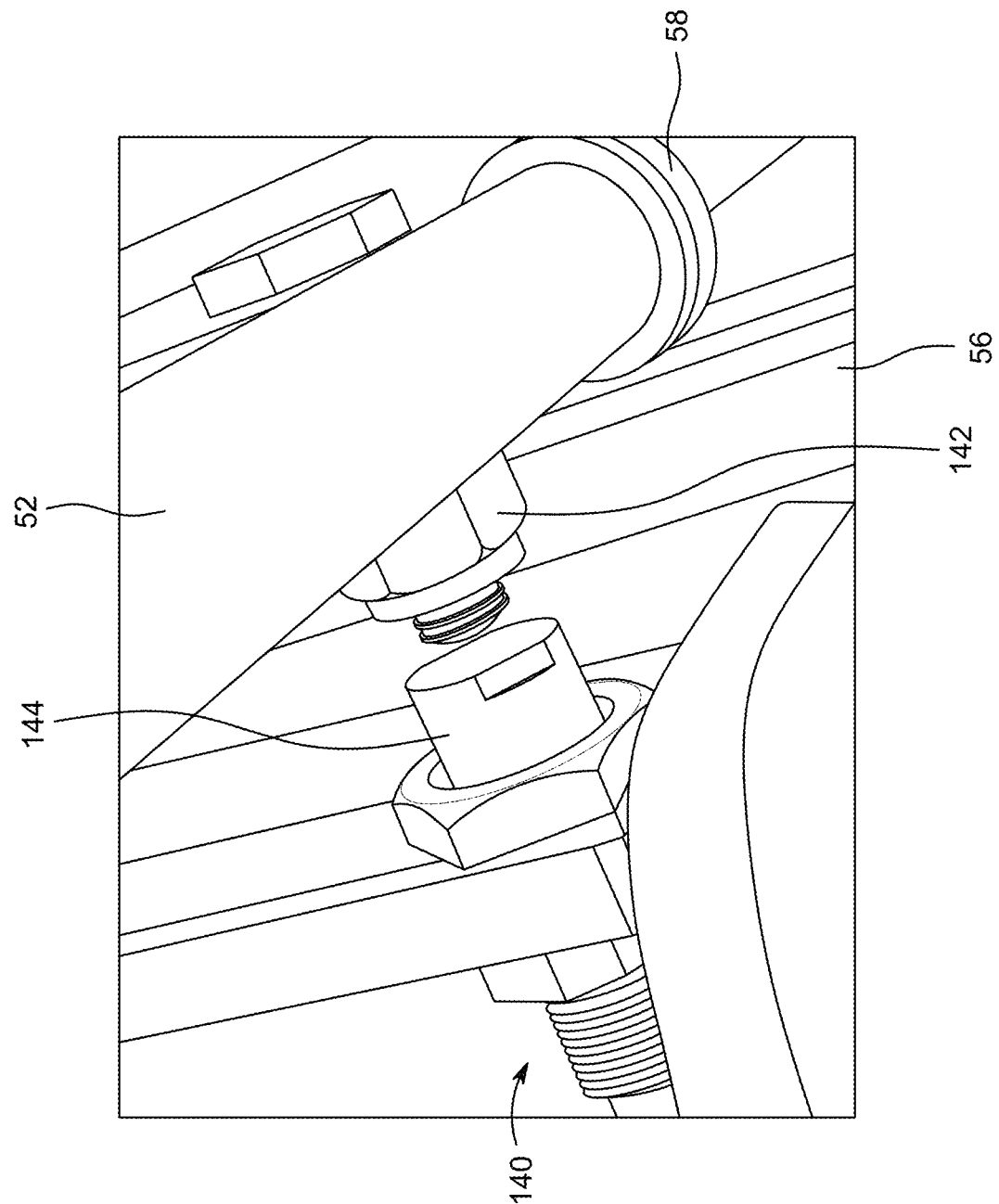
FIG. 3 is a perspective view of components of a position detecting system in accordance with an embodiment.
Figure 4:
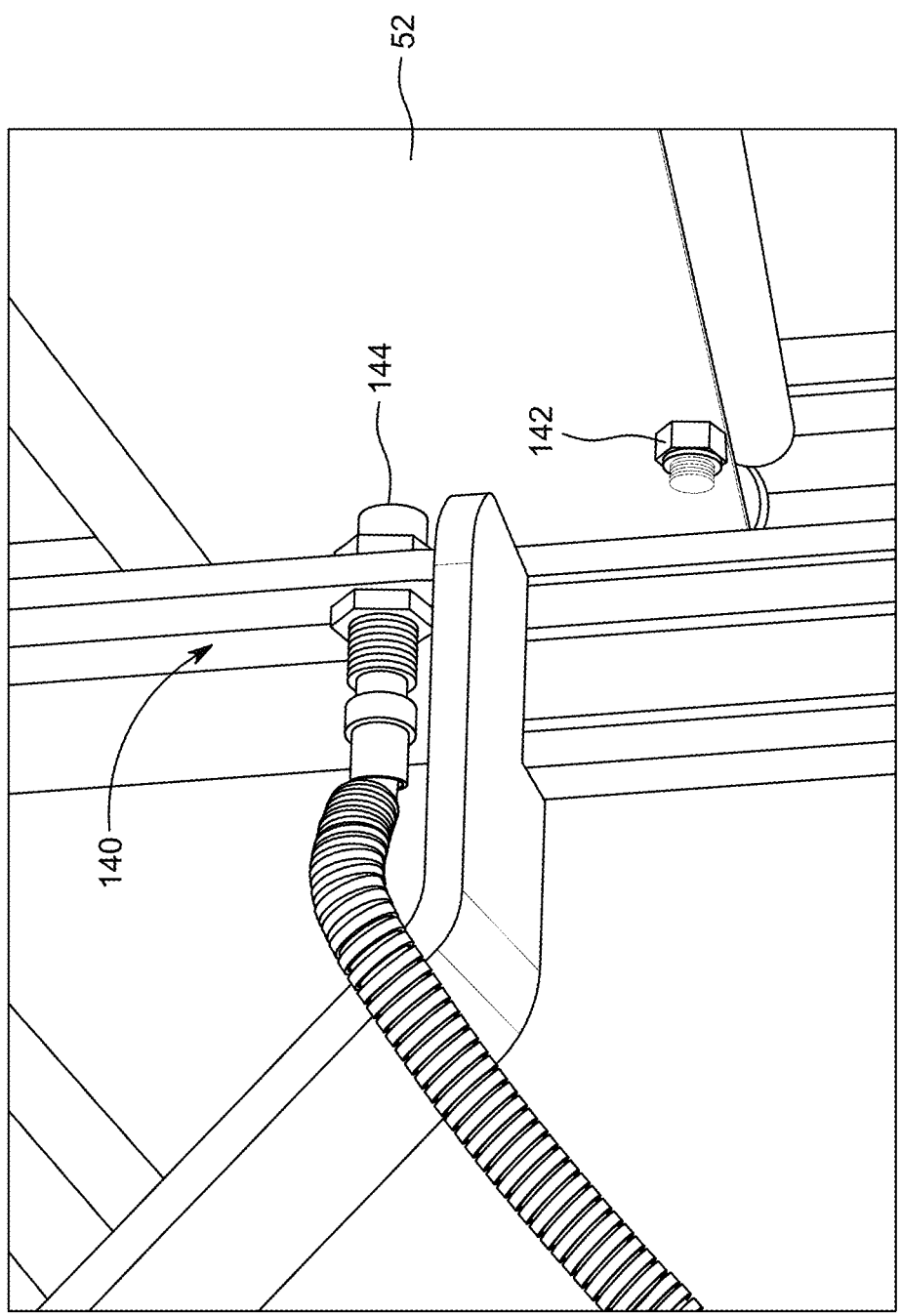
FIG. 4 is a perspective view of the components of a position detecting system in a mounting configuration according to an embodiment, with the door illustrated in an intermediary position.

Referring now additionally to FIGS. 3 and 4. The bays 50 comprise a position detection system 140 which is part of the control circuit 40. The position detection system 140 comprises a detectable door-mounted position detection component 142 and body-mounted position detection component comprising of a body-mounted detector 144. When the door-mounted position detection component 142 is in the vicinity of the body-mounted detector 144, the body-mounted detector 144 detects the presence of the door-mounted position detection component 142 and sends a signal to the control circuit 40 indicative of the proximity of the door-mounted position detection component 142 to the body-mounted detector 144 that is indicative of a position of the bay door 52, triggering the motor 102 to stop. Such a position detection system 140 is used for detecting at least one of the bay doors 52 having reached an open position and/or at least one of the bay doors 52 having reached a closed position.

The electrical system of the door opening system 100 further comprises electric (not shown) part of the control circuit 40. The electric relays are electrically connected to a body-mounted detector 144, to switches (not shown) and to the motor 102.

According to one embodiment, at least one of the body-mounted detector 144 and the detectable door-mounted position detection component 142 is present twice, mounted at different positions. Accordingly, when the first combination of detectable door-mounted position detection component 142 and body-mounted detector 144 is aligned (i.e., they are in close proximity or approaching each other), the position detection system 140 associates that state with a first terminal door position (open or closed); and when the second combination of detectable door-mounted position detection component 142 and body-mounted detector 144 is aligned, the position detection system 140 associates that state with the other terminal door position (the other of open or closed).

According to a specific embodiment, two (2) body-mounted detectors 144 are mounted to the body 22 about the guide rails 56 detect the positions of the bay doors 52, with a signal from the first one of the body-mounted detectors 144 indicating an open position and a signal from the second one of the body-mounted detectors 144 indicating a closed position of the bay doors 52. According to an embodiment, the body-mounted detectors 144 detect changes in a magnetic flux due to the approach of the detectable door-mounted position detection component 142 to detect alignment of the detectable door-mounted position detection component 142 with the body-mounted detector 144.

According to other embodiments, other technologies may be used as a position detection system 140 is a similar fashion, such as end-of-course detectors which upon contact from a surface (a part of the body 22 of the merchandise container 20 if mounted to a bay door 52, or a part of the bay door 52 if mounted to the body 22 of the merchandise container 20), or optical devices which detect presence of objects in a monitored zone.

According to an embodiment, a biasing means (not shown) is mounted to at least one of the bay doors 52 providing compensation for the weight of the bay doors. The use of the biasing means being designed to minimize the power required by the motor 102 The weight of the bay doors 52 is sufficient to return the bay doors 52 to the closed position.

According to an embodiment, a single biasing means (similar to counter balances 134) operates over all of the bay doors 52 interconnected through a common intermediate axle 114. The force applied by the biasing means is thus communicated to the other bay doors 52 via the intermediate axle 114 powered by the same motor 102.

According to an embodiment, the door opening system 100 operates without the presence of a counter balance 134.

The same principle applies to the position detection system 140. Since one bay door 52, of a series of bay doors 52, interconnected through a common intermediate axle 114 may not move independently from other bay doors 52, a single (or main) position detection system 140 operating on a single bay door 52 may be used to provide information on the state of all of the bay doors 52.

According to an embodiment, the biasing means applies a force that combines with the weight of the bay doors 52 to ease closing the bay doors 52. Accordingly, the motor 102 operates in three (3) modes:

a) an opening mode. In this mode, the motor 102 pulls the driving chain 108 so that the bay doors 52 move upwardly toward an open position;

b) an idle mode. In this mode, the motor 102 maintains the driving chain in the current position. Thus, the motor maintains the bay doors 52 in their position, preventing the movement of the bay doors 52 resulting from exterior forces; and c) a neutral mode. In this mode, the motor 102 allows movement of the driving chain 108 resulting from exterior forces. Since the gravitational forces applied on the bay doors 52 are toward a closed position, the bay doors 52 in this mode tend to move towards the closed position. Once the bay doors 52 are detected as being closed, the motor 102 resets to the idle mode.

According to an embodiment, one or more additional detectable door-mounted position detection components 142 are mounted relative the bay doors 52 to provide information on incoherent states of the bay doors 52, such as different signals from one body-mounted detector 144 being in conflict with the signal from another body-mounted detector 144. Such incoherence of the signals may be due, for instance, to a driving chain being broken resulting in a bay door 52 being closed or stuck in mid-course while the others being open.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A door opening system for a merchandise container comprising a plurality of bay doors, the door opening system comprising:
   a plurality of door axles each driving individually a bay door of the plurality of bay doors between a closed position and an open position;
   an intermediate axle in driving arrangement with the plurality of door axles; and
   a motor connected in driving arrangement with the intermediate axle comprising a driving axle;
   a driving sprocket mounted to the driving axle;
   a driven sprocket mounted to the intermediate axle;
   a main driving chain connecting the driving sprocket to the driven sprocket;
   a plurality of door driving sprockets mounted to the intermediate axle;
   a door driven sprocket mounted to each of the door axles; and
   a plurality of door driving chains with each one of the door driving chains connecting one of the door driving sprockets to a corresponding door driven sprocket;
   wherein the motor drives the intermediate axle which in turn drives the plurality of door axles to move the plurality of bay doors between the closed position to the open position.

2. The door opening system of claim 1, further comprising a pin, wherein, using the pin, a releasable sprocket among the plurality of door driving sprockets is releasably mounted to a releasable axle among the axles, whereby the releasably sprocket can be released from the releasably axle by removing the pin.

3. The door opening system of claim 1, further comprising a counter balance providing a force towards the opening of the bay doors.

4. The door opening system of claim 3, wherein the counter balance is mounted to one of the door axles.

5. The door opening system of claim 3, wherein the counter balance is mounted to the intermediate axle.

6. The door opening system of claim 1, further comprising a control circuit adapted to transmit signals to the motor.

7. The door opening system of claim 1, wherein the motor operates in three modes comprising:
   an opening mode in which the motor spins the driving axle for opening the bay doors;
   an idle mode in the motor is locked in position thereby preventing spinning of the driving axle; and
   a neutral mode in which the driving axle is free to spin backward resulting in the bay doors closing.

8. The door opening system of claim 1, further comprising a position detection system comprising a door-mounted position detection component and a body-mounted position detection component, wherein when the door-mounted position detection component is in close proximity to the body-mounted position detection component, a signal indicative of a monitored position being reached is triggered.

9. The door opening system of claim 1, further comprising a cable or a strap linking each of the door axles with a corresponding one of the bay doors.

10. A merchandise container comprising:
    a body having a longitudinal axis, the body comprising:
       a side wall; and
       a plurality of bays in the side walls;
    a plurality of bay doors adapted to controllably close the bays; and
    a door opening system comprising:
       a plurality of door axles each driving individually one of the plurality of bay doors between a closed position and an open position;
       an intermediate axle in driving arrangement with the plurality of door axles; and
       a motor connected in driving arrangement with the intermediate axle comprising a driving axle;
    wherein the motor drives the intermediate axle which in turn drives the plurality of door axles to move the plurality of bay doors between the closed position and the open position,
    wherein the plurality of bay doors comprises neighbor bay doors,
    wherein the body comprises a dividing wall extending between the neighbor bay doors, and
    wherein at least one of:
       the door axles are mounted to the dividing wall;
       the door opening system comprises a bearing assembly mounted to the dividing wall and through which extends the intermediate axle; and
       the motor is mounted to the dividing wall.

11. The merchandise container of claim 10, further comprising guiding rails extending about the bays, and wherein the guiding rails extends between the body and the door axles.

12. The merchandise container of claim 10, wherein the body comprises a front wall and a rear wall, and wherein the motor is mounted to one of the front wall and the rear wall.

13. The merchandise container of claim 10, further comprising an electrical system, wherein the door opening system is connected to the electrical system.

14. The merchandise container of claim 10, wherein the door opening system further comprises a control circuit adapted to transmit signals to the motor.

15. The merchandise container of claim 10, wherein the side wall comprises an interior face, wherein the body comprise guiding rails adapted for guiding the bay doors, and wherein the guiding rails extend at least about the interior faces of the side wall.

* * * * *